United States Patent
Eckert et al.

(10) Patent No.: US 10,339,067 B2
(45) Date of Patent: Jul. 2, 2019

(54) MECHANISM FOR REDUCING PAGE MIGRATION OVERHEAD IN MEMORY SYSTEMS

(71) Applicant: Advanced Micro Devices, Inc., Sunnyvale, CA (US)

(72) Inventors: Yasuko Eckert, Bellevue, WA (US); Thiruvengadam Vijayaraghavan, Madison, WI (US); Gabriel H. Loh, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/626,623

(22) Filed: Jun. 19, 2017

(65) Prior Publication Data
US 2018/0365167 A1 Dec. 20, 2018

(51) Int. Cl.
*G06F 12/1036* (2016.01)
*G06F 12/1009* (2016.01)

(52) U.S. Cl.
CPC ...... *G06F 12/1036* (2013.01); *G06F 12/1009* (2013.01); *G06F 2212/1024* (2013.01); *G06F 2212/68* (2013.01)

(58) Field of Classification Search
CPC ............ G06F 12/1036; G06F 12/1009; G06F 2212/1024; G06F 2212/68
See application file for complete search history.

(56) References Cited

U.S. PATENT DOCUMENTS

| | | | |
|---|---|---|---|
| 2006/0026359 A1* | 2/2006 | Ross | G06F 12/1027 711/133 |
| 2007/0226795 A1* | 9/2007 | Conti | G06F 21/554 726/22 |
| 2007/0294494 A1* | 12/2007 | Conti | G06F 12/123 711/158 |
| 2011/0191536 A1 | 8/2011 | Mizuno | |
| 2012/0047312 A1 | 2/2012 | Nathuji | |
| 2014/0164722 A1 | 6/2014 | Garthwaite et al. | |
| 2015/0095598 A1 | 4/2015 | Abou Gazala et al. | |
| 2017/0147227 A1 | 5/2017 | Stabrawa et al. | |

OTHER PUBLICATIONS

Black, D., et al., "Translation Lookaside Buffer Consistency: A Software Approach*", ACM 1989, pp. 113-122.
Conway, P., et al., "Cache Hierarchy and Memory Subsystem of the AMD Opteron Processor", IEEE 2010, pp. 16-29.
(Continued)

*Primary Examiner* — Larry T Mackall
(74) *Attorney, Agent, or Firm* — Zagorin Cave LLP (57) ABSTRACT

A technique for use in a memory system includes swapping a first plurality of pages of a first memory of the memory system with a second plurality of pages of a second memory of the memory system. The first memory has a first latency and the second memory has a second latency. The first latency is less than the second latency. The technique includes updating a page table and triggering a translation lookaside buffer shootdown to associate a virtual address of each of the first plurality of pages with a corresponding physical address in the second memory and to associate a virtual address for each of the second plurality of pages with a corresponding physical address in the first memory.

14 Claims, 6 Drawing Sheets

(56) References Cited

OTHER PUBLICATIONS

Ramos, L., et al., "Page Placement in Hybrid Memory Systems", ACM 2011, 11 pages.
U.S. Appl. No. 15/095,778, filed Apr. 11, 2016, entitled "Region Migration Cache", by inventor Patrick N. Conway.
International Search Report and Written Opinion dated Oct. 2, 2018 from co-pending PCT Application No. PCT/US2018/037460, 17 pages.

* cited by examiner

MECHANISM FOR REDUCING PAGE MIGRATION OVERHEAD IN MEMORY SYSTEMS

STATEMENT REGARDING FEDERALLY SPONSORED RESEARCH OR DEVELOPMENT

This invention was made with Government support under Prime Contract Number DE-AC52-07NA27344, Subcontract No. B609201 awarded by DOE. The Government has certain rights in this invention.

BACKGROUND

Description of the Related Art

In a typical computing system, a memory system is designed with a goal of low latency experienced by a processor when accessing arbitrary units of data. In general, a memory system that has memory portions with different latencies (e.g., a non-uniform memory access (NUMA) memory system or a multi-level memory system) uses page migration techniques to reduce memory access latency by moving contents of one portion of main memory into lower latency portions of main memory in response to individual memory accesses. In general, those techniques rely on software and require either operating system interception or introduce substantial overhead during migration.

An exemplary non-uniform memory access (NUMA) memory system includes a processor and at least two levels of dynamic random access memory (DRAM) or other memory where the bandwidth of the second level memory is lower than the bandwidth of the first level memory and the latency of the second level memory is higher than the latency of the first level memory. In the exemplary NUMA memory system, the first level memory is in-package memory and the second level memory is off-package memory. Conventional page migration techniques store more frequently accessed data in the first level of memory, closest to the processor, to enhance performance by reducing memory latency and increasing bandwidth available to the most frequently accessed data. However, conventional page migration techniques require substantial overhead, e.g., page copy, cache invalidation, translation lookaside buffer (TLB) shootdown, and page-table update. As referred to herein, a TLB shootdown is a coherency transaction that interrupts processor operation to perform TLB consistency operations. In a system including multiple processors, each processor including a TLB for a shared memory, each processor performs a corresponding TLB shootdown to maintain consistent TLB entries. The processor that executes an operation causing a need for the TLB shootdown sends an interrupt to each other processor that needs to execute a TLB shootdown for consistency purposes. That overhead, which may be implemented in hardware or software, can be large and may substantially impact performance for workloads that frequently migrate memory. Accordingly, improved page migration techniques are desired.

SUMMARY OF EMBODIMENTS OF THE INVENTION

In at least one embodiment, a method for use in a memory system includes swapping a first plurality of pages of a first memory of the memory system with a second plurality of pages of a second memory of the memory system. The first memory has a first latency and the second memory has a second latency. The first latency is less than the second latency. The method includes updating a page table and triggering a translation lookaside buffer shootdown to associate a virtual address of each of the first plurality of pages with a corresponding physical address in the second memory and to associate a virtual address for each of the second plurality of pages with a corresponding physical address in the first memory. The swapping may include copying the first plurality of pages from the first memory to a staging buffer. The method may include copying the second plurality of pages from the second memory of the memory system to the staging buffer. The method may include writing data to a copy of a first page of the plurality of pages in the staging buffer and writing the data to the first page in the first memory in response to a write instruction to the first page during the copying of the first plurality of pages to the staging buffer. The swapping may include copying the first plurality of pages from the staging buffer to the second memory. The swapping may include copying the second plurality of pages from the staging buffer to the first memory. The swapping may include updating a first redirection state of each of the first plurality of pages and a second redirection state of each of the second plurality of pages to indicate that the first plurality of pages and the second plurality of pages, respectively, are being copied from the staging buffer. The method may include migrating a third plurality of pages from the second memory of the memory system to a first plurality of unused pages in the first memory of the memory system. The method may include updating the page table and triggering a second translation lookaside buffer shootdown to associate a virtual address for each of the third plurality of pages with a corresponding physical address in the first memory.

In at least one embodiment, an apparatus includes migration control logic configured to swap N first pages of a first memory of a memory system with N second pages of a second memory of the memory system. The first memory has a first latency and the second memory has a second latency. The first latency is less than the second latency. The apparatus includes a page table configured to store virtual-to-physical address translations for all pages of the memory system. The apparatus includes a translation lookaside buffer configured to store recently used virtual-to-physical address translations for pages of the memory system. The migration control logic is further configured to update the page table and trigger a translation lookaside buffer shootdown to associate a virtual address of each of the N first pages with a corresponding physical address in the second memory and to associate a virtual address for each of the N second pages with a corresponding physical address in the first memory, where N is an integer greater than one. The apparatus may include a staging buffer having a size of at least 2×N pages. The migration control logic may be configured to copy N first pages of a first memory of a memory system to the staging buffer. The migration control logic may be configured to copy N second pages of a second memory of the memory system to the staging buffer. The apparatus may include a memory controller configured to write data to a copy of a first page of the N first pages in the staging buffer and to write the data to the first page in the first memory in response to a write instruction to the first page during the copying of the N first pages to the staging buffer.

In at least one embodiment, a method for page migration in a memory system includes migrating a first plurality of pages to a first plurality of unused pages in a first memory of the memory system from a second memory of the memory system. The first memory has a first latency and the second memory has a second latency, the first latency is less than the second latency. The method may include updating a page table and triggering a translation lookaside buffer shootdown to associate a virtual address for each of the first plurality of pages with a corresponding physical address in the first memory. The method may include swapping a second plurality of pages of the first memory with a third plurality of pages of the second memory of the memory system. The method may include updating the page table and triggering another translation lookaside buffer shootdown to associate a virtual address of each of the second plurality of pages with a corresponding physical address in the second memory and to associate a virtual address for each of the third plurality of pages with a corresponding physical address in the first memory.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A memory system that implements page migration with reduced overhead copies a plurality of pages from a higher latency memory and a plurality of pages from a lower latency memory, into a staging buffer before actual page migration begins. The staging buffer is large enough (e.g., a staging buffer having a size of 2× N pages, where N is an integer greater than one) to allow migration of multiple pages at the same time (e.g., up to N pages being swapped between the higher latency memory and the lower latency memory), further reducing migration overhead by consolidating otherwise multiple distinct TLB shootdowns or other coherency transaction into one event, thus reducing the impact on performance of page migrations. As referred to herein, a page is a fixed-length, contiguous block of memory, which is described by a single entry in a page table, and is the smallest unit of data for address translations in a virtual memory operating system.

Figure 1:
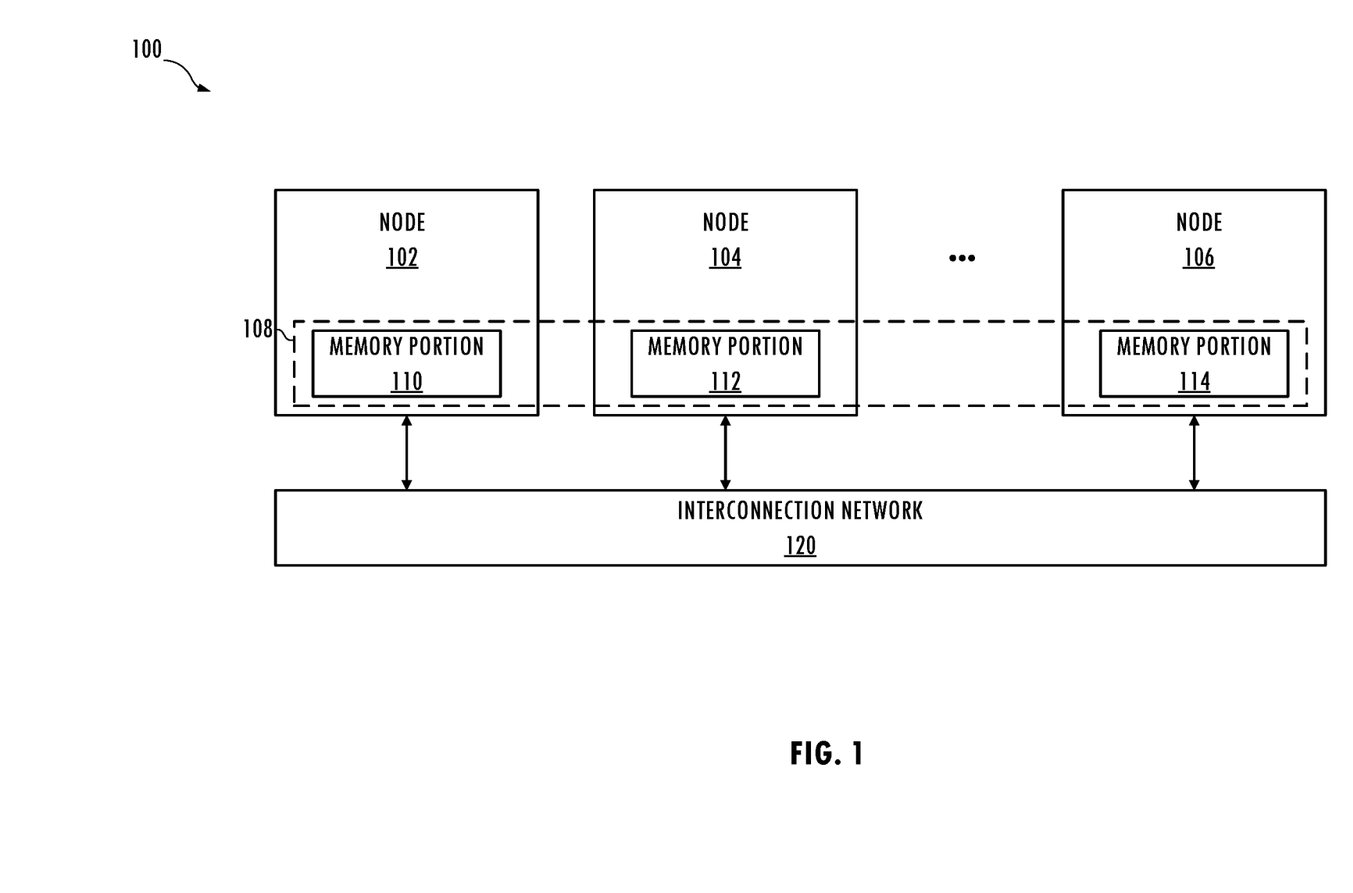
FIG. 1 illustrates a functional block diagram of a non-uniform memory access processing system.

Referring to FIG. 1, system 100 is an exemplary non-uniform memory access processing system including multiple processing nodes (e.g., node 102, node 104, and node 106) that communicate with each other using interconnection network 120. Each node includes one or more processors and a corresponding memory portion (e.g., memory portion 110, memory portion 112, and memory portion 114), and memory system 108. Each of the nodes can access the memory portion within the node faster than memory in another node. The processing nodes use inter-processor communication to maintain coherency of a memory image in memory system 108 when more than one cache contains the contents of the same location of memory system 108. System 100 implements a cache coherency policy using a probe filter in fast static Random Access Memory (RAM) associated with a memory controller (not shown) or other suitable technique.

Figure 2:
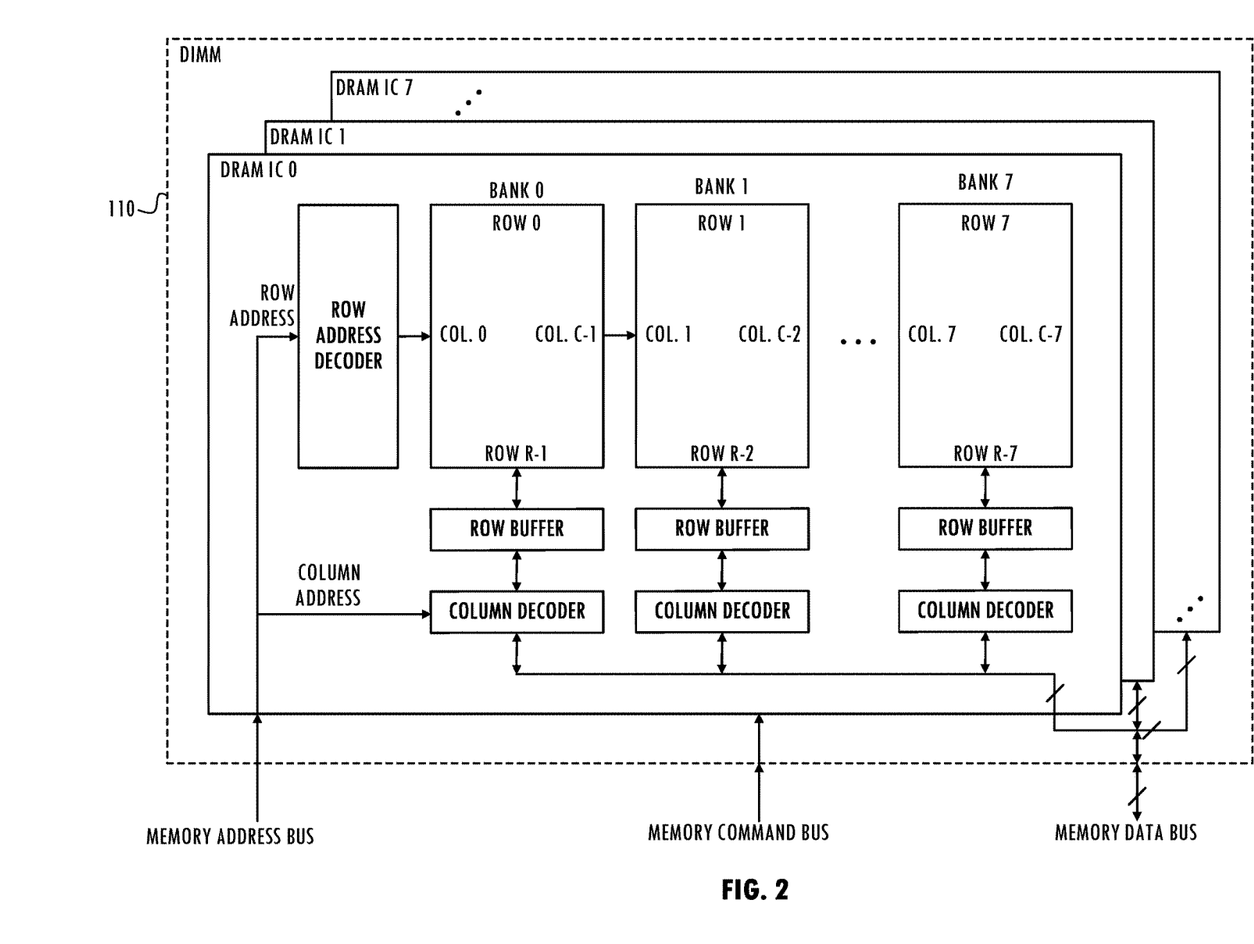
FIG. 2 illustrates a functional block diagram of a portion of a memory system.

Referring to FIG. 2, an embodiment of memory portion 110 includes one or more memory integrated circuits (e.g., one or more dynamic RAM (DRAM) integrated circuits). In at least one embodiment, the memory system includes multiple memory integrated circuits, which are accessed in parallel (e.g., configured as a dual in-line memory module (DIMM)). Each memory integrated circuit may include a data interface (e.g., 8-bit data interface) that is combined with data interfaces of other memory integrated circuits to form a wider data interface (e.g., 64-bit data interface). Each memory integrated circuit may include multiple independent memory banks, which can be accessed in parallel. Each memory bank may include a two-dimensional array of DRAM cells, including multiple rows and columns. A location of the memory may be accessed using a memory address including bank, row, and column fields. In at least one embodiment of memory system 108, only one row in a bank may be accessed at a time and the row data may be stored in a row buffer dedicated to that bank. An activate command moves a row of data from the memory array into the row buffer. Once a row is in the row buffer, a read or write command may read/write data from/to the associated memory address. Thus, the latency of a memory command partially depends on whether or not a corresponding row is in a row buffer of an associated memory bank.

If the contents of a memory address are in the row buffer (i.e., the memory address hits the row buffer), then a memory controller only needs to issue a read or write command to the memory bank, which in an embodiment has a read memory access latency of $t_{CL}$ or write memory access latency of $t_{WL}$, respectively. If the contents of the memory address are not present in the row buffer (i.e., the memory address misses the row buffer), then the memory controller needs to precharge the row buffer, issue an activate command to move a row of data into the row buffer, and then issue a read or write command to the memory bank, which, in an embodiment, has an associated read memory access latency of $t_{RCD}+t_{CL}+t_{RP}$ or write memory access latency of $t_{RCD}+t_{WL}+t_{RP}$, respectively, where $t_{RCD}$ is the required delay time between an active command row address strobe and a column address strobe and $t_{RP}$ is the row precharge latency.

Figure 3:
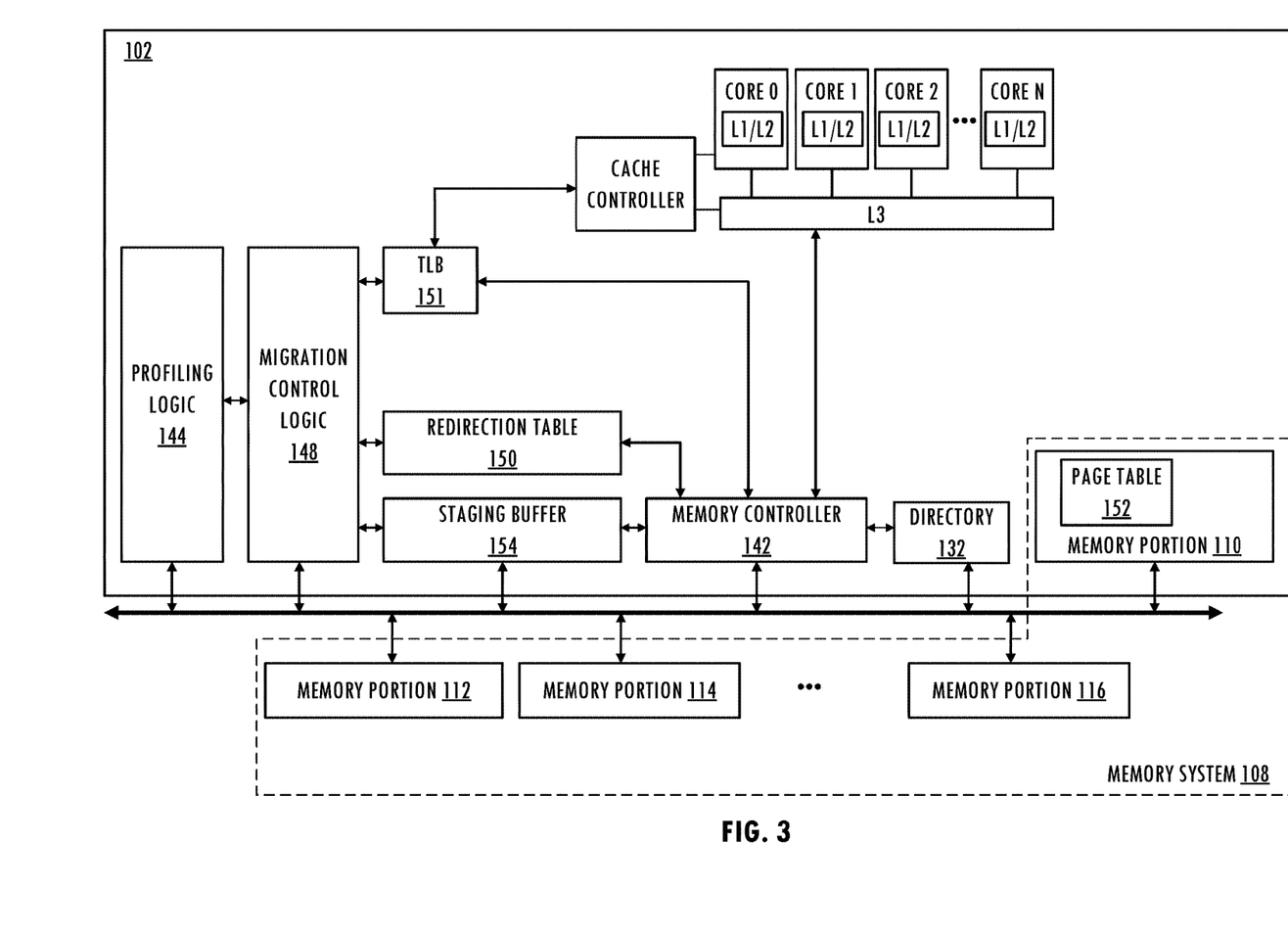
FIG. 3 illustrates a functional block diagram of a processing system including a reduced-overhead page migration system consistent with at least one embodiment of the invention.

Referring to FIG. 3, node 102 includes one or more processors. For example, node 102 includes multiple cores (e.g., core 0, core 1, core 2, . . . , core N), but other embodiments of node 102 integrate other combinations of processor units (e.g., at least one accelerated processing unit including a central processing unit and a graphics processing unit, central processing unit, graphics processing unit, or other processor and may include coprocessors or fixed-function processing hardware). Directory 132 includes storage for a cache directory used to maintain coherence of the caches of node 102 and memory system 108 using a directory-based cache coherence policy. Directory 132 is implemented using fast static random access memory or other suitable technique. FIG. 3 illustrates page table 152 as being included within memory portion 110. However, note that in other embodiments, page table 152 is included in another portion of memory system 108 or as a separate structure.

Figure 4:
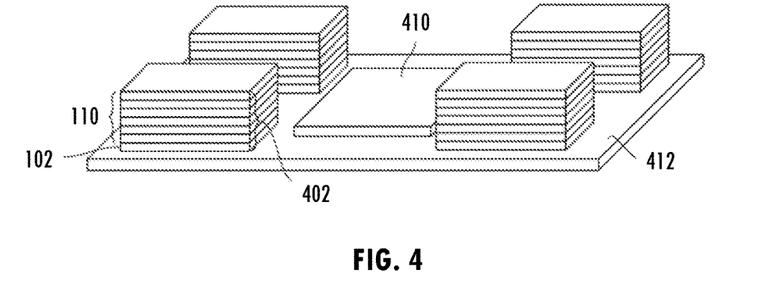
FIG. 4 illustrates a functional block diagram of an exemplary memory portion.

Memory portion 110 may be integrated with portions of node 102 on an integrated circuit, in a multi-chip module, or on a printed circuit board with portions of node 102, or may be stacked vertically on top of portions of node 102, as illustrated in FIG. 4. Stacking memory vertically on top of a processor increases memory bandwidth and reduces access energy, both of which are critical for performance and energy efficiency. However, due to the limited capacity of the memory that can be stacked on top of the processor, external, off-package memory, which may be included in other nodes, is also required to provision enough total memory capacity. A processor-in-memory implementation includes at least a portion of node 102 as processing logic within one or more memory dies or as a separate logic die in stack 402, which also includes one or more memory dies. Host 410 and four processor-in-memory devices are formed on interposer 412. Note that the memory portions of FIGS. 2 and 4 are exemplary only and the teachings described herein apply to systems including memory portions having other memory architectures.

Referring to FIG. 3, a reduced overhead page-migration technique uses staging buffer 154 to provide continuous access to memory locations while migrating one or more pages between different levels of memory. In some embodiments of the reduced overhead page migration technique, the reduced overhead page migration technique uses one set of migration pages, but in other embodiments, multiple migration pages and/or additional levels of memory are used (e.g., N first-level pages). The reduced overhead page migration technique includes profiling logic 144, which profiles memory accesses on the memory bus and maintains memory access frequency values for at least some of the pages in memory (e.g., P pages of Q pages in memory, where P and Q are integers and P≤Q). In at least one embodiment, profiling logic 144 maintains memory access frequency values for each page in memory. For example, profiling logic 144 uses hardware counters implemented using predetermined memory locations (e.g., in static random access memory) storing a count value for each page in memory system 108. Note that the storage structure of memory access information and implementation and policies of profiling logic 144 and migration control logic 148 are exemplary only and other data structures, implementations and policies consistent with the teachings herein may be used.

Profiling logic 144 increments a frequency value each time a processor of node 102 reads or writes a corresponding page in memory system 108. If a page being accessed is not currently being tracked by an embodiment of profiling logic 144 having P<Q, a replacement policy (e.g., a least-recently used replacement policy) is used to evict an existing count entry for another page and inserts a new count entry for the page being accessed. In at least one embodiment, profiling logic 144 periodically clears or left-shifts the per-page access frequency values to reduce history bias. Migration control logic 148 periodically compares the memory access frequency values of each page in a level of memory, e.g., using a linear scan or other suitable technique. Migration control logic 148 performs that comparison in the background (i.e., without interrupting program execution of a processor of node 102). Thus, the comparisons are not in the critical path of program execution of a processor of node 102. Migration control logic 148 identifies candidates for page migration based on the comparisons. For example, migration control logic 148 identifies as candidates for page migration, N first-level pages that have the lowest access frequencies, and frequencies that are less than N highest memory access frequencies of highest frequency memory access pages in one or more other higher latency memory. A threshold number of difference in memory access frequencies may be used. For example, if the first-level pages have access frequencies of at least L accesses (where L is an integer greater than 0) less than access frequencies of the second-level page, then the second-level pages are candidates for migration to the first-level memory. The predetermined threshold can be determined statically or dynamically at runtime.

After identifying pages for swapping between the lower latency memory and the one or more higher latency memories, migration control logic 148 generates control signals and memory commands that cause memory system 108, redirection table 150, TLB 151, page table 152, and staging buffer 154 to swap physical locations of the candidate pages using staging buffer 154. After identifying candidates for page migration, migration control logic 148 swaps the target page in higher-latency memory with the same number of victim pages in the lower latency memory. The migration includes copying each of those candidates into staging buffer 154 prior to the actual page migration, which occurs in the background. The copying does not cause any interrupt to program execution of a processor of node 102. While copying the pages to staging buffer 154, the data continues to be accessible from the original memory locations. Migration control logic 148 introduces redundancy to write operations to those pages to maintain consistency. For example, while memory controller 142 handles the write operation to the original memory locations, consistent with a conventional write operation, migration control logic 148 also writes the data to a copy of the page in staging buffer 154.

After completion of the copy to staging buffer 154, migration control logic 148 uses redirection table 150 to redirect all read and write accesses to those two pages to staging buffer 154. Redirection table 150 indicates which pages have active copies in staging buffer 154. Accordingly, in response to a memory access, memory controller 142 first checks redirection table 150 to determine whether to access the corresponding pages in staging buffer 154 before accessing any target memory devices. In at least one embodiment, rather than use redirection table 150 and a comparison with a target address of a memory operation, the redirection information may be incorporated into TLB 151, e.g., by allocating additional bits in TLB 151 for each entry along with the page-level, virtual-to-physical address mapping information. The additional bits indicate whether the target page associated with a corresponding TLB entry has an active copy in staging buffer 154.

After completion of copying the candidate pages to staging buffer 154, migration control logic 148 copies those pages from staging buffer 154 to the new physical memory locations. During the copying from staging buffer 154, memory read requests made to a candidate page access staging buffer 154 instead of the corresponding candidate memory portion, while memory write requests write to both staging buffer 154 and the corresponding candidate memory portion. Once the copy from staging buffer 154 completes, the migration is complete, and migration control logic 148 de-allocates staging buffer 154 and corresponding entries in redirection table 150, or clears the corresponding redirection bits in TLB 151. Migration control logic 148 also issues a TLB shootdown and updates TLB 151 and page table 152 with updated virtual-to-physical address translations according to the new physical locations of the pages involved in the migration. Migration control logic 148 also triggers cache invalidation and any other consistency operations. Migration control logic 148 coordinates the timing of page migration across all candidate pages such that those pages migrate simultaneously and a single TLB shootdown event occurs for all of those migrated pages.

Figure 5:
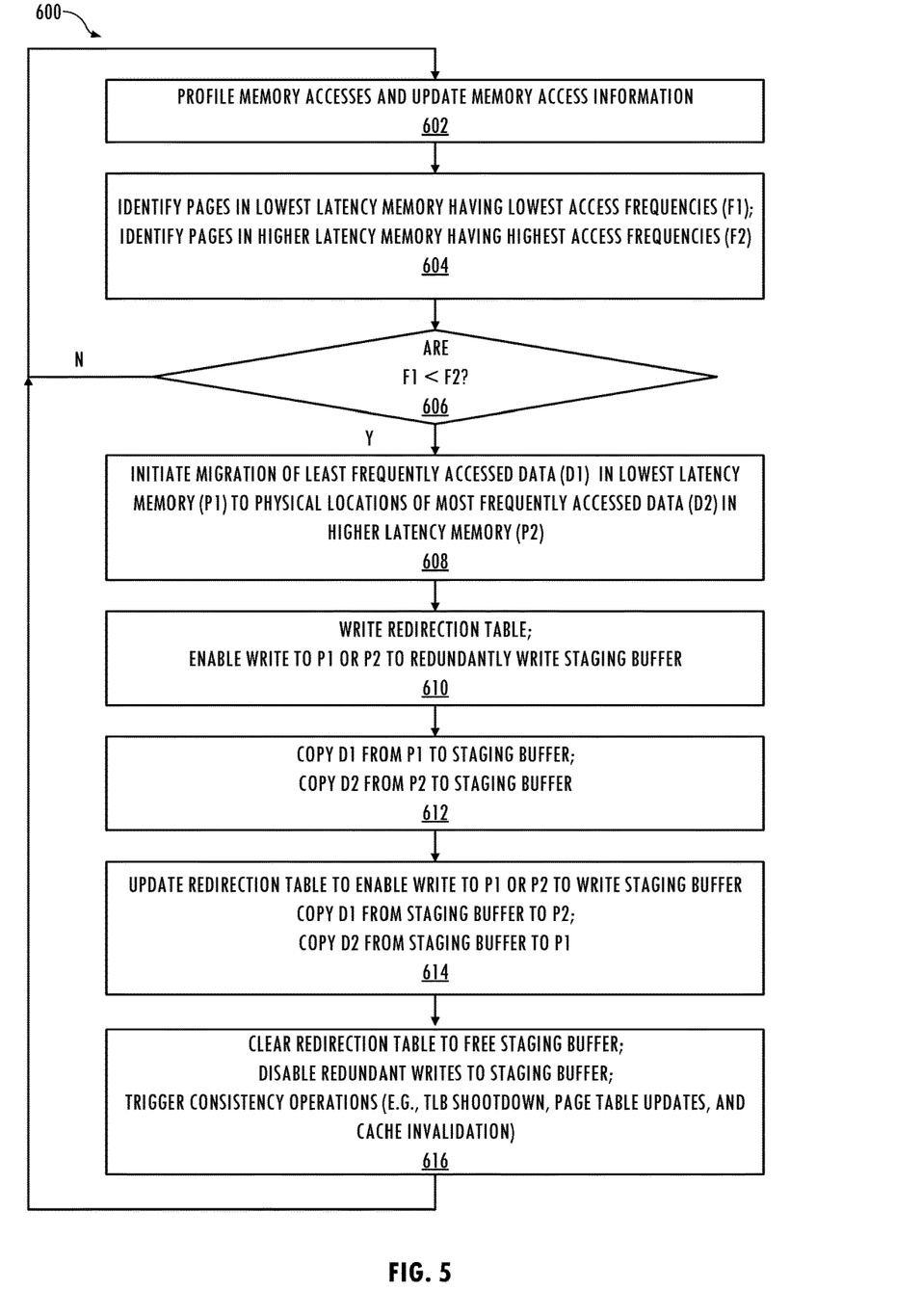
FIG. 5 illustrates exemplary information and control flows for the reduced overhead page migration system using a staging buffer consistent with at least one embodiment of the invention.

Referring to FIGS. 3 and 5, in at least one embodiment, profiling logic 144 and migration control logic 148 provide various control signals to cause system 100 to generate the exemplary information and control flows 600. Implementations of profiling logic 144 and migration control logic 148 include application-specific circuits or general purpose processing logic configured to execute instructions consistent with information and control flows 600. Migration control logic 148 searches memory access information stored in profiling logic 144 to identify pages in lowest latency memory (e.g., memory portion 110) having the lowest memory access frequencies (e.g., frequencies F1) and to identify pages in high latency memory (e.g., memory portions 112, 114, or 116) having highest access frequencies (e.g., frequencies F2) of the pages in higher latency memory (604). Migration control logic 148 compares frequencies F1 to frequencies F2 (606). In one embodiment, if frequencies F1 are less than frequencies F2, then the corresponding pages are suitable candidates for migration. If migration control logic 148 fails to identify N suitable candidates for migration, profiling of memory access information continues (602) and migration control logic 148 continues to periodically search memory access information stored in profiling logic 144 for at least N suitable migration candidates. Note that fewer than N pages may be swapped if the conditions described herein are met by fewer than N pages. If migration control logic 148 fails to identify any suitable candidates for migration, profiling of memory access information continues (602) and migration control logic 148 continues to periodically search memory access information stored in profiling logic 144 for suitable migration candidates.

After successfully identifying candidates for migration, migration control logic 148 initiates a swap of physical locations of the candidate pages in lowest latency memory (i.e., physical locations P1) of least frequently accessed data (i.e., candidate data D1, which includes N pages) in the lowest latency memory with the physical locations in higher latency memory (i.e., physical locations P2) of most frequently accessed data (i.e., candidate data D2) in the higher latency memory (608). The swap includes writing redirection table 150, or corresponding entries in TLB 151, to indicate that the pages stored in those physical locations are being migrated (610). In addition, migration control logic 148 enables any write to the candidate pages in those physical locations to cause a redundant write to a corresponding copy in staging buffer 154 (610). Migration control logic 148 copies candidate data D1 from physical locations P1 of the lowest latency memory to staging buffer 154 and copies candidate data D2 from physical locations P2 of the higher latency memory to staging buffer 154 (612).

After the candidate pages have been copied to staging buffer 154, migration control logic 148 updates redirection table 150 to enable any write to the candidate pages in those physical locations to cause a write to a corresponding copy in staging buffer 154 (614). Migration control logic 148 copies candidate data D1 from staging buffer 154 to physical locations P2 and copies candidate data D2 from staging buffer 154 to physical locations P1 (614). After the candidate data has been copied from staging buffer 154 to the appropriate physical locations, migration control logic 148 clears redirection table 150, or corresponding entries in TLB 151, to indicate completion of the migration of the pages stored in those physical locations (616). In addition, migration control logic 148 disables the redundant writes to staging buffer 154, triggers consistency operations, e.g., a TLB shootdown, updates to corresponding entries in page table 152, and cache invalidation (616). Note that the information and control flows of FIG. 5 are exemplary only and other information and control flows that maintain data dependencies are consistent with the reduced overhead page migration technique described herein. As a result, one consistency operation updates any affected TLBs for multiple page migrations, thus, improving system performance by amortizing the cost of the consistency operations over multiple page migrations.

Figure 6:
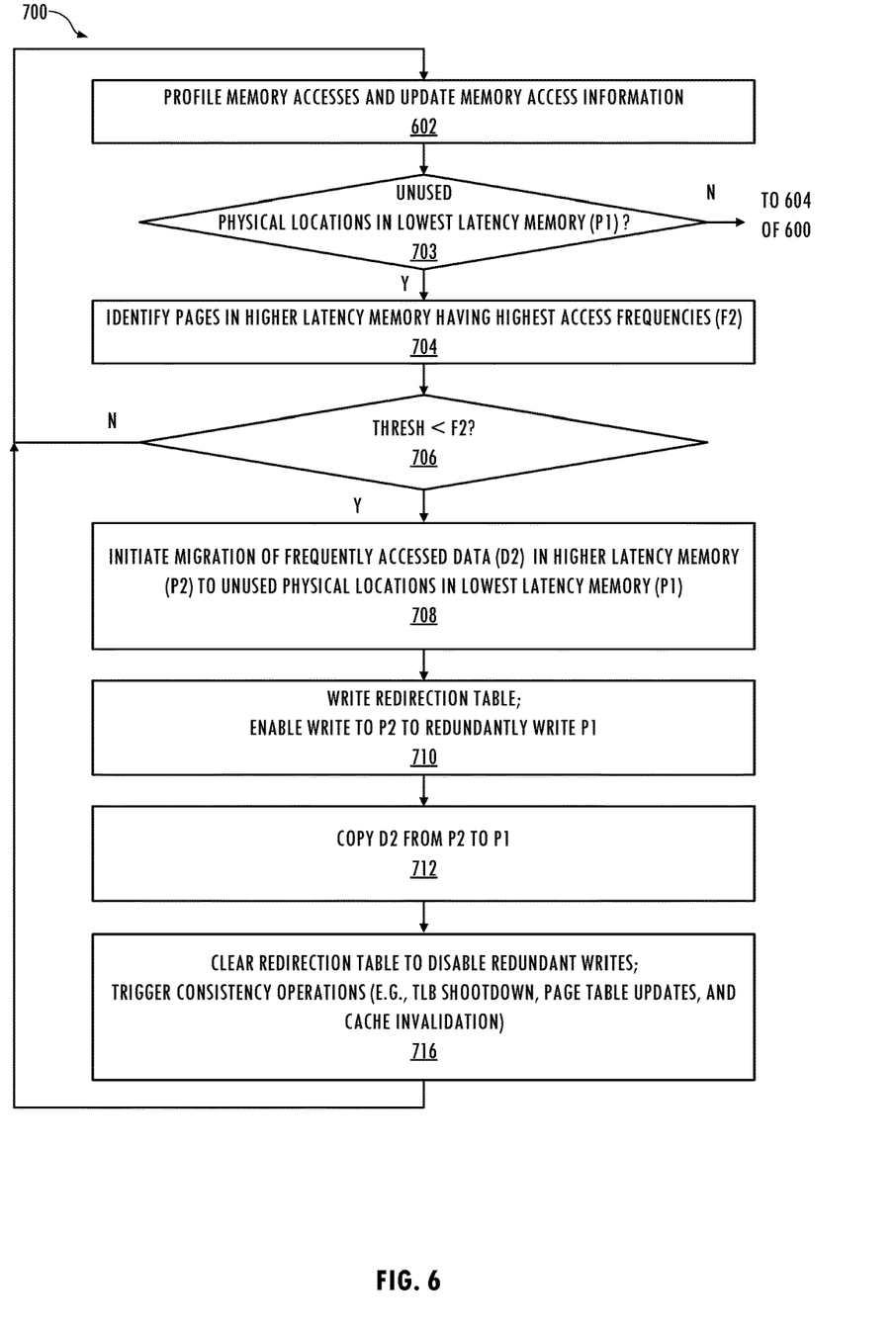
FIG. 6 illustrates exemplary information and control flows for the reduced overhead page migration system consistent with at least one embodiment of the invention.

Referring to FIGS. 3 and 6, in at least one embodiment, memory portions 110 may have unused memory space that may be initially set aside for page migration (e.g., see exemplary information and control flows 700). If insufficient physical locations in lowest latency memory (physical locations P1) are unused and available for page migration (703), migration control logic proceeds to 604 of exemplary information and control flows 600 described above. If sufficient unused memory space is available in lowest latency memory for one or more page migration scenarios (703), staging buffer 154 is unused. Migration control logic 148 searches memory access information stored in profiling logic 144 to identify pages in higher latency memory (e.g., memory portions 112, 114, or 116) having highest access frequencies (e.g., frequencies F2) (704). In one embodiment, if frequencies F2 are greater than predetermined threshold THRESH (706), then the corresponding pages are suitable candidates for migration. If migration control logic 148 fails to identify N suitable candidates for migration (706), profiling of memory access information continues (602) and migration control logic 148 continues to periodically search memory access information stored in profiling logic 144 for at least N suitable migration candidates. Note that fewer than N pages may be migrated if the conditions described herein are met by fewer than N pages. If migration control logic 148 fails to identify any suitable candidates for migration, profiling of memory access information continues (602) and migration control logic 148 continues to periodically search memory access information stored in profiling logic 144 for suitable migration candidates.

After successfully identifying candidates for migration, migration control logic 148 initiates a migration of physical locations of the candidate pages in higher latency memory (i.e., physical locations P2) of frequently accessed data (i.e., candidate data D2) in the higher latency memory with the available unused physical locations in lowest latency memory (i.e., physical locations P1) (708). The migration includes writing redirection table 150, or corresponding entries in TLB 151, to indicate that the pages stored in those physical locations are being migrated (710). In addition, migration control logic 148 enables any write to the candidate pages in those physical locations of the higher latency memory (P2) to cause a redundant write to a corresponding copy in lowest latency memory (P1) (710). Migration control logic 148 copies candidate data D2 from physical locations P2 of the higher latency memory to physical locations P1 in lowest latency memory (712).

After the candidate data has been swapped, migration control logic 148 clears redirection table 150, or corresponding entries in TLB 151, to indicate completion of the migration of the pages stored in those physical locations (716). In addition, migration control logic 148 disables the redundant writes, triggers consistency operations, e.g., a TLB shootdown, updates to corresponding entries in page table 152, and cache invalidation (716). Note that the information and control flows of FIG. 6 are exemplary only and other information and control flows that maintain data dependencies are consistent with the reduced overhead page migration technique described herein. As a result, one consistency operation updates any affected TLBs for N page migrations, thus, improving system performance by amortizing the cost of the consistency operations over multiple page migrations.

Accordingly, techniques for reduced overhead page migration have been described. While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which pages of memory are migrated, one of skill in the art will appreciate that the teachings herein can be utilized with other fixed region sizes. In addition, the techniques described herein can be utilized with multi-level memory systems (i.e., memory systems using a hierarchy of devices similar to cache hierarchies), as well as in non-uniform memory access memory systems. Variations and modifications of the embodiments disclosed herein, may be made based on the description set forth herein, without departing from the scope of the invention as set forth in the following claims.

What is claimed is:

1. A method for use in a memory system comprising:
    swapping a first plurality of pages of a first memory of the memory system with a second plurality of pages of a second memory of the memory system, the first memory having a first latency and the second memory having a second latency, the first latency being less than the second latency; and
    updating a page table and triggering a translation lookaside buffer shootdown to associate a virtual address of each of the first plurality of pages with a corresponding physical address in the second memory and to associate a virtual address for each of the second plurality of pages with a corresponding physical address in the first memory,
    wherein the swapping comprises:
        copying the first plurality of pages from the first memory to a staging buffer;
        copying the second plurality of pages from the second memory to the staging buffer; and
        writing data to a copy of a first page of the first plurality of pages in the staging buffer and writing the data to the first page in the first memory in response to a write instruction to the first page during the copying of the first plurality of pages to the staging buffer.

2. The method, as recited in claim 1, wherein the swapping further comprises:
    updating a first redirection state of each of the first plurality of pages and a second redirection state of each of the second plurality of pages to indicate that the first plurality of pages and the second plurality of pages, respectively, are being copied to the staging buffer,
    wherein the writing is based on the first redirection state of the first page.

3. The method, as recited in claim 1, wherein the swapping further comprises:
    copying the first plurality of pages from the staging buffer to the second memory;
    copying the second plurality of pages from the staging buffer to the first memory; and
    updating a first redirection state of each of the first plurality of pages and a second redirection state of each of the second plurality of pages to indicate that the first plurality of pages and the second plurality of pages, respectively, are being copied from the staging buffer.

4. The method, as recited in claim 3, wherein the swapping further comprises:
    writing a copy of the first page in the staging buffer in response to a second write instruction to the first page during the copying of the first plurality of pages from the staging buffer.

5. The method, as recited in claim 3, wherein the swapping further comprises:
    updating the first redirection state of each of the first plurality of pages and the second redirection state of each of the second plurality of pages to release the staging buffer upon completion of copying the first plurality of pages and the second plurality of pages from the staging buffer.

6. The method, as recited in claim 1, further comprising:
    counting a frequency of memory access for individual pages of the memory system to generate memory access information;
    identifying a plurality of pages in the first memory having lowest memory access frequencies in the first memory as the first plurality of pages based on the memory access information; and
    identifying a plurality of pages in the second memory having highest memory access frequencies in the second memory as the second plurality of pages based on the memory access information, the highest memory access frequencies being greater than the lowest memory access frequencies.

7. The method, as recited in claim 1, further comprising:
    migrating a third plurality of pages from the second memory of the memory system to a first plurality of unused pages in the first memory of the memory system; and
    updating the page table and triggering a second translation lookaside buffer shootdown to associate a virtual address for each of the third plurality of pages with a corresponding physical address in the first memory.

8. An apparatus comprising:
    migration control logic configured to swap N first pages of a first memory of a memory system with N second pages of a second memory of the memory system, the first memory having a first latency and the second memory having a second latency, the first latency being less than the second latency;

a page table configured to store virtual-to-physical address translations for all pages of the memory system; and a translation lookaside buffer configured to store recently used virtual-to-physical address translations for pages of the memory system, a staging buffer having a size of at least 2×N pages, wherein the migration control logic is configured to copy N first pages of a first memory of a memory system to the staging buffer and configured to copy N second pages of a second memory of the memory system to the staging buffer; and a memory controller configured to write data to a copy of a first page of the N first pages in the staging buffer and to write the data to the first page in the first memory in response to a write instruction to the first page during the copying of the N first pages to the staging buffer, wherein the migration control logic is further configured to update the page table and trigger a translation lookaside buffer shootdown to associate a virtual address of each of the N first pages with a corresponding physical address in the second memory and to associate a virtual address for each of the N second pages with a corresponding physical address in the first memory, where N is an integer greater than one.

9. The apparatus, as recited in claim 8, further comprising:

redirection state storage configured to store a first redirection state of the N first pages of the first memory and a second redirection state of the N second pages of the second memory indicating whether copies of the N first pages and the N second pages are being copied to the staging buffer, wherein the migration control logic is further configured to update the first redirection state and the second redirection state to indicate that the N first pages and the N second pages are being copied to the staging buffer.

10. The apparatus, as recited in claim 8, wherein the memory controller is further configured to write data to the copy of the first page in the staging buffer in response to a second write instruction to the first page during copying of the N first pages from the staging buffer to the second memory.

11. The apparatus, as recited in claim 8, further comprising:

memory access information storage configured to store a memory access frequency count for individual pages of the memory system; and a memory bus coupled to the memory system and the memory access information storage; and profiling logic coupled to the memory bus and the memory access information storage, the profiling logic being configured to count a frequency of memory access for individual pages of the memory system and store the frequency of memory access for the individual pages in the memory access information storage, wherein the migration control logic is further configured to identify N lowest frequency pages in the first memory as the N first pages based on contents of the memory access information storage and to identify N highest frequency pages in the second memory as the N second pages based on the contents of the memory access information storage.

12. The apparatus, as recited in claim 11, wherein the profiling logic comprises:

a plurality of counters including an individual counter of the plurality of counters corresponding to an individual page of the memory system; and logic to identify the N lowest frequency pages in the first memory and to identify the N highest frequency pages in the second memory, each of the N highest frequency pages having memory access frequencies greater than memory access frequencies of each of the N lowest frequency pages.

13. A method for use in a memory system comprising:

swapping a first plurality of pages of a first memory of the memory system with a second plurality of pages of a second memory of the memory system, the first memory having a first latency and the second memory having a second latency, the first latency being less than the second latency; and updating a page table and triggering a translation lookaside buffer shootdown to associate a virtual address of each of the first plurality of pages with a corresponding physical address in the second memory and to associate a virtual address for each of the second plurality of pages with a corresponding physical address in the first memory, wherein the swapping comprises updating a first redirection state of each of the first plurality of pages and a second redirection state of each of the second plurality of pages to indicate that the first plurality of pages and the second plurality of pages, respectively, are being copied to a staging buffer.

14. The method, as recited in claim 13, further comprising:

writing data to a copy of a first page of the first plurality of pages in the staging buffer and writing the data to the first page in the first memory in response to a write instruction to the first page during the copying of the first plurality of pages to the staging buffer, wherein the writing is based on the first redirection state of the first page.

* * * * *